Aug. 18, 1964  F. H. JONKMAN  3,145,164
APPARATUS FOR WET-SCREENING A MIXTURE OF FINE ABRASIVE PARTICLES
Filed Feb. 7, 1961  3 Sheets-Sheet 3
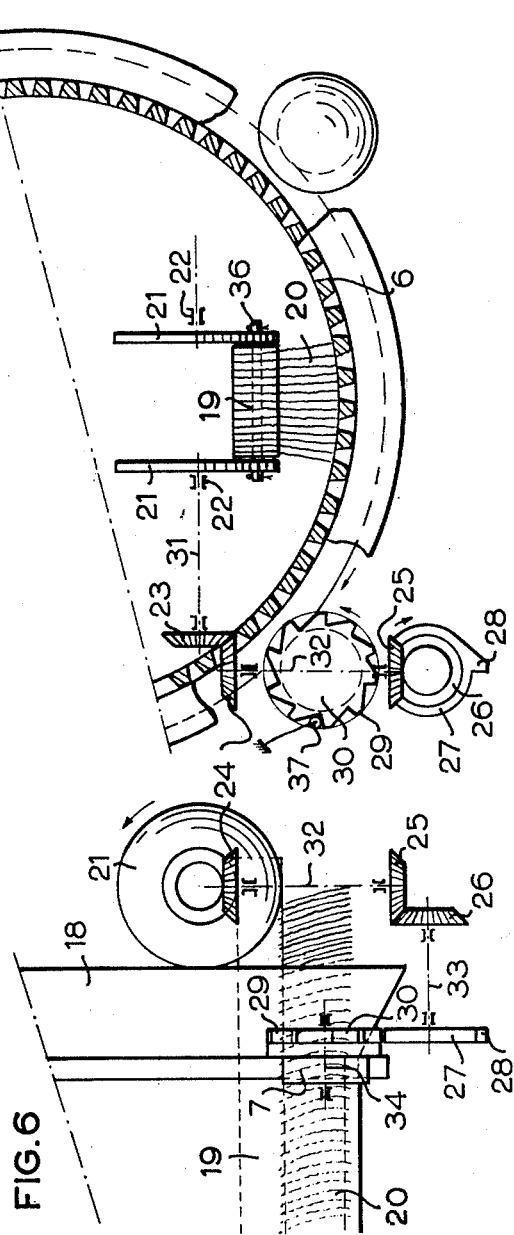

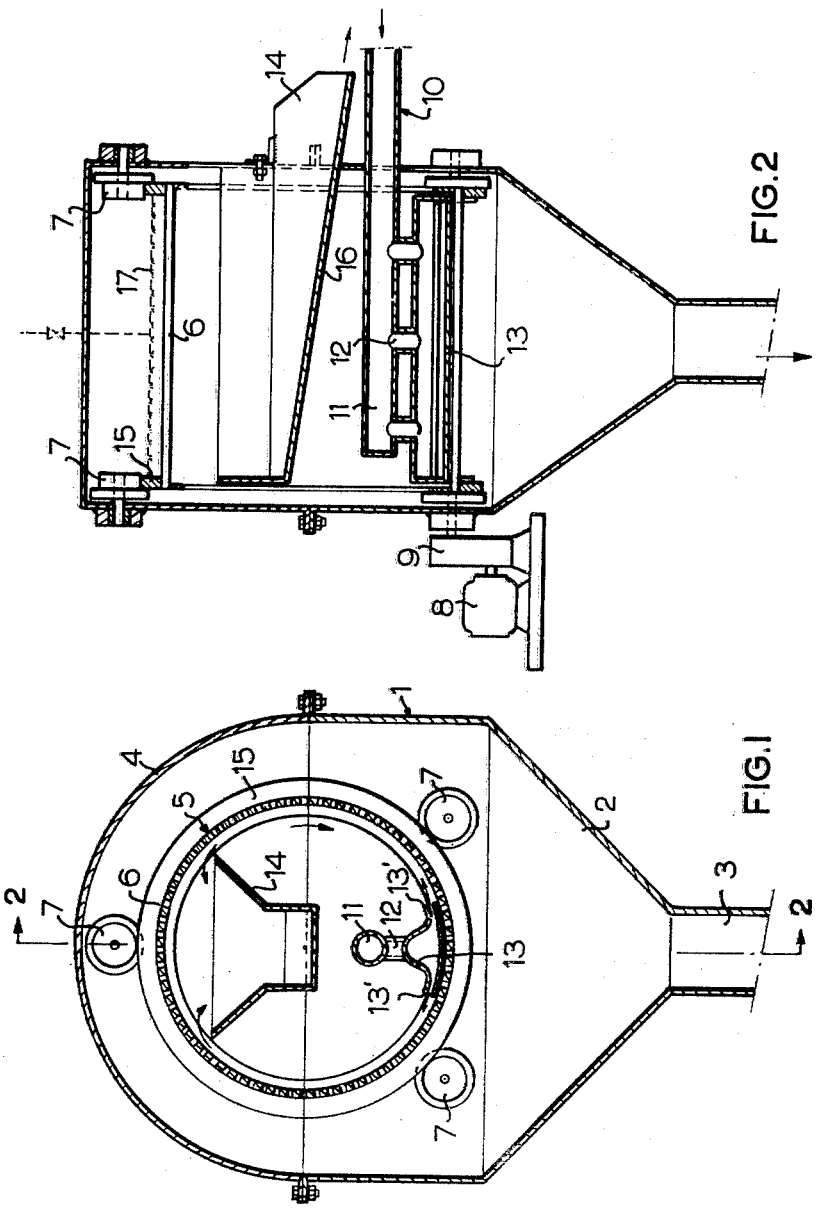

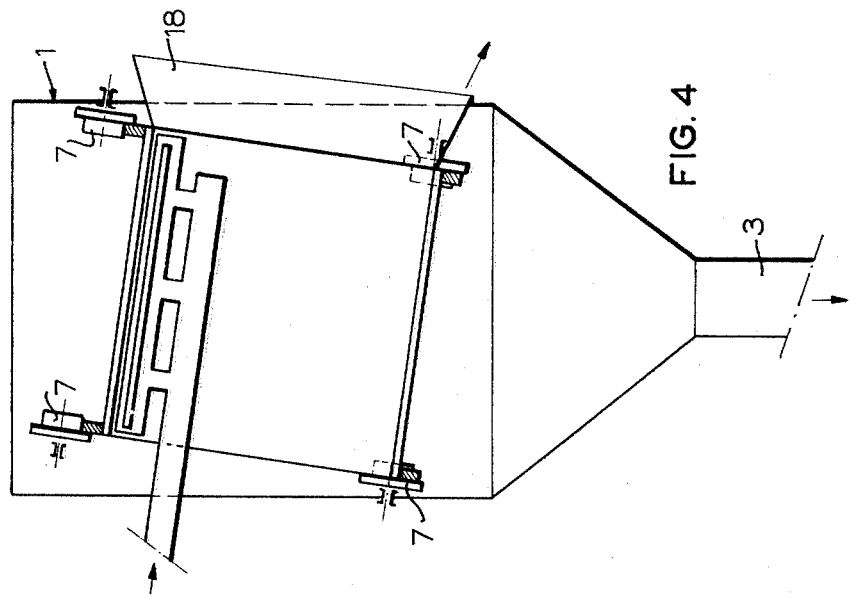
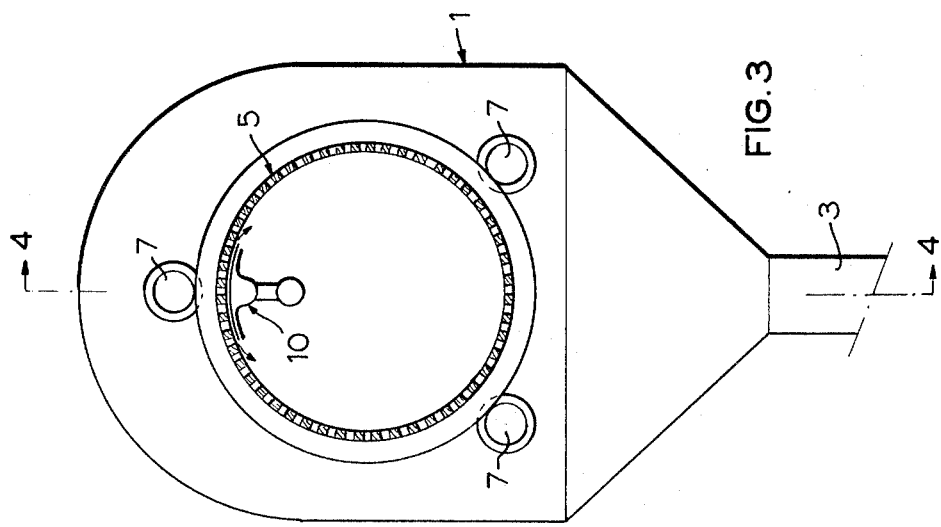

United States Patent Office 3,145,164
Patented Aug. 18, 1964

3,145,164
APPARATUS FOR WET-SCREENING A MIXTURE
OF FINE ABRASIVE PARTICLES
Frederik H. Jonkman, Geleen, Netherlands, assignor to
Stamicarbon N.V., Heerlen, Netherlands
Filed Feb. 7, 1961, Ser. No. 87,678
Claims priority, application, Netherlands, Feb. 12, 1960,
248,385
2 Claims. (Cl. 209—254)

This invention relates to wet screening and has particular reference to a new and improved apparatus for separating solid materials from abrasive mixtures, cement slurries, coal and ore mixtures, and the like.

As is disclosed in the Fontein Patent No. 2,916,142, if a wet mixture of solid materials is passed transversely over a sieve bend defined by a plurality of parallel spaced apart bars extending perpendicular to the flow of the mixture, a separation is effected of particles which have a size in the order of magnitude of half the width of the slots between adjacent bars.

In wet screening abrasive materials and the like, the sides of the bars facing the feeding means wear off more rapidly than the sides facing the discharge end of the screening deck, so that in course of time the separation will be made at a smaller particle size. To meet this difficulty, it has been proposed to reverse, periodically, the direction of flow of the material along the screening deck. In this regard, various prior art devices allow for periodically interchanging the feed end and the discharge end of the screening deck. For this operation the feed of material has to be temporarily interrupted. In addition, there remains the drawback of a somewhat irregular variation of the particle size of separation, which, after each reversal of the screening deck, gradually decreases, starting from a certain maximum value, to return to very nearly the original value immediately after the reversal.

The prior art teaches the provision of a screening apparatus consisting of a rotary drum of screen gauze or the like, and in which the material to be screened is ejected symmetrically in opposite directions onto the screening deck by means of a feeding device. In such apparatus, which is specially designed for screening fibrous material, the suspension is fed in at an acute angle with the plane tangent to the cylinder periphery at the point where the suspension strikes the screening surface.

In such screening of fibrous material by means of a rotary screen consisting of very fine screen gauze, with the mesh width attuned to the size of the particles to be retained, problems arise through the necessity for keeping the screening deck clean. Previous processes were different in that a screen gauze of large mesh width was used and the screening proper was effected by the cake of coarse fibers retained on the screening deck. The screening deck is kept clean mainly by the overflow fraction left in the bottom part of the drum.

Still other screening devices are known in the art, which are periodically tipped so that their feed and discharge ends change places. Such devices still have the shortcoming that the one-sided wear decreases from the feed end of the screening deck towards the discharge end.

The present invention has for an object to overcome the difficulties of the prior art screening techniques, by providing a new and improved apparatus for screening abrasive material, and the like.

Another object of this invention is to provide a screening deck constructed as a closed cylinder which rotates about its longitudinal axis, together with oppositely directed feeding means, which is symmetrical with respect to a plane of symmetry through the axis of rotation and which feeds the material in oppoiste directions tangentially onto the screening deck.

Another object of this invention is to provide a new and improved wet screening apparatus which is subjected to uniform wear, as each bar or dam will, in its turn, be brought in front of the feed opening; further, the apparatus according to this invention is reliable and trouble-free in operation over extended periods of time.

Another object of this invention is to provide a cylindrical screening deck with means for intermittent rotating of the screening deck about its longitudinal axis.

Still another object of this invention is to provide feeding means for the suspension opening into the bottom part of the cylinder wherein the collecting device for the overflow fractions is over the said feeding device. Accordingly, it is possible for the feed rate of the suspension to be such that the overflow fractions leave the screening deck in places over the horizontal plane through the cylinder axis and flow along generally parabolic lines into the collecting device. However, it is also possible for the feed rate to be sufficiently high that the overflow fractions collide in the top of the cylinder and subsequently drop together into the collecting device.

These and other objects of the present invention will become more apparent during the course of the following detailed description and appended claims.

The invention may best be understood with reference to the accompanying drawings wherein an illustrative embodiment is shown.

In the drawings:

FIGURE 1 is a full section, front elevation view of an embodiment of this invention;

FIGURE 2 is a view along the line II—II in FIGURE 1;

FIGURE 3 is a diagrammatic front elevation view of a modified embodiment of the invention in FIGURES 1 and 2;

FIGURE 4 is a diagrammatic view taken along the line IV—IV in FIGURE 3;

FIGURE 5 is a diagrammatic vertical longitudinal section of a cylinder having a horizontal axis of rotation and means for discharging the overflow fraction;

FIGURE 6 is an enlarged view of the discharging means according to FIGURE 5; and FIGURE 7 is a partial front elevation view of the cylinder and the discharging means according to FIGURES 5 and 6.

According to this invention, there is provided a cylindrical screening deck made up of bars running parallel to the longitudinal axis of the screening deck defining longitudinal slots, a feeding device enabling the material to be treated to be fed as a layer of uniform thickness tangentially onto the concave side of the screening deck and in a direction essentially perpendicular to the longitudinal axis thereof, means for reversing the direction of flow of the material along the screening deck, and devices for collecting and discharging the separated fractions.

Reference is now made to FIGURES 1 and 2 wherein a housing indicated generally at 2 is shown which includes a bottom part 2 with a discharge conduit 3 at its lower end, and a hood 4 which is bolted to the bottom part 2. A cylinder 5 is constructed of spaced apart bars 6 which are fitted in the holder 15 (FIGURE 2) and mounted substantially parallel to the longitudinal axis of the cylinder 5. The cylinder 5 is rotatably mounted between a number of guide rollers 7, one of which is driven through an electric motor 8 and a reduction gear 9, as shown in FIGURE 2, thus providing for rotation of the cylinder 5 at a constant speed.

It is also possible, however, to provide the reduction gear with a driving mechanism of the type used in counting mechanisms for gas, electricity, and water meters, in which, after a complete revolution of one wheel, a following wheel is caused to perform only a partial revolution, thereby causing the rotation of the cylinder 5 to be intermittent, as will become apparent in FIGURES 6 and 7.

Mounted over the bottom interior part of the cylinder 5 is a feeding device 10, consisting of a feed pipe 11, which is connected by means of connecting pieces 12 to the distributor 13. The distributor 13 is provided with two slot-like mouthpieces 13′, which are so shaped that the suspension ejected from them is fed onto the inner wall of the cylinder formed by the bars 6 as a layer, essentially in a direction tangential to the inner wall of the cylinder 5.

A device 14 is provided for collecting and discharging the overflow fraction and is mounted at such a height over the feeding device 10 in the interior of the drum 5 that the material fed in at the rate previously determined for the material to be treated, drops into the discharge device when leaving the screening deck. The discharge device 14 preferably has a sloping bottom 16, as shown in FIGURE 2. The undersize fraction is discharged through the pipe 3. If so desired, a spray pipe 17 (indicated by dotted lines in FIGURE 2) may be mounted over the highest point of the drum 5.

The apparatus in FIGURES 1 and 2 operates as follows: At a predetermined velocity, which is primarily related to the concentration and viscosity of the suspension, the suspension supplied by the feeding device 10 is ejected in two layer-shaped part-currents through the slots 13′ of the mouthpiece 13, tangentially onto the concave side of the screening deck, defined by the bars 6, in a direction generally perpendicular to the longitudinal axis thereof. If the cylinder 5 is made to rotate continuously, the peripheral speed of the screening deck is taken into account in determining the feed velocity. The velocity of the feed will be determined at that part of the screening deck where the direction of the material stream is qual to the direction of rotation. In this part, the difference between the feed velocity and the speed of rotation must be so great that it is still possible to screen to a maximum particle size, which is in the order of magnitude of half the slot width. Dependent on the feed velocity, the layers forming the overflow fractions leave the screening deck in the upper part of the cylinder 5 and subsequently drop along generally parabolic paths into the discharge device 14. At a sufficiently high feed velocity these layers may even collide in or near the highest point of the cylinder, as is apparent.

In the embodiment according to the FIGURES 3 and 4, where corresponding parts are indicated by the same reference numerals, as in FIGURES 1 and 2, the feeding device 10 is inverted from its position in FIGURES 1 and 2, and is in the upper part of the cylinder 5. This arrangement offers the advantage that a low feed velocity suffices, as no difference in height need be overcome. To make possible removal of the overflow fraction, the cylinder 5 is placed with its axis of rotation at a small angle with the horizontal and one end of the cylinder 5 is provided with a conical rim 18.

Referring now to FIGURES 5–7, still another embodiment of the invention is provided wherein the axis of rotation of the cylinder 5 is again generally horizontal, and a horizontally disposed pushing device 19 (FIGURE 5) is mounted over the bottom part of the cylinder, to push the solid particles retained by the screening deck across a rim 18. This device 19 may, at the same time, serve to clean the slots between the bars 6. The device 19 consists of a long, flat movable brush 20 which is fixedly mounted to the device 19 and has hairs which protrude into and thence out of the slots during movement thereof, as will be understood. The movement of the device 19 may be coupled with the movement of the cylinder 5. According to the FIGURES 5–7, both ends of brush 20 are fixed to a shaft 36, which is rotatable by and mounted between each pair of longitudinally spaced apart discs 21. The part of the shaft 36 within the both of the brush is fixed thereto. The discs 21 are rotated by a drive mechanism (not shown) on a drive shaft 31 which is, in turn, mounted in bearings 22, as shown in FIGURE 7.

Also as shown in FIGURE 7, drive shaft 31 is only connected to the left hand disc 21, right hand disc 21 being independently supported to provide for the rotational movement of brush 20. Right hand discs 21 are rotated in unison with left hand discs 21 by connection through device 19, brush 20 and shafts 36. As indicated by FIGURE 5, the brush 20 is subjected to a reciprocating or pumping type sweeping action with each revolution of the discs 21, the brush hairs making a movement parallel to the bars 6 in the slots and also pushing the solid particles present in the slots forwardly and upwardly.

With respect to the operation of the discs 21 driving the brush 20, note that (FIGURES 5 and 7) the discs 21 are rotatable about drive shaft axis 31 and pivotally carry the brush ends via the shafts 36 at the periphery of the discs. Thus, when the discs 21 are rotated in unison, by virtue of the pivotal connections at 36, the brush moves longitudinally in a counterclockwise path (FIGURE 5) brushing the bars 11, then moves upwardly and longitudinally to the left, then downwardly and back along the bars to repeat the cycle.

A first bevel gear 23 is fixed on the drive shaft 31, the bevel gear 23 cooperating with a second bevel gear 24 which is mounted on a shaft 32. Also secured to the shaft 32 opposite the bevel gear 24 is a third bevel gear 25. A fourth bevel gear 26 engages the third bevel gear 25, the fourth bevel gear being mounted on the shaft 33. The shaft 33 also has a disc 27 mounted thereon, the disc 27 having a cam 28 extending therefrom. A member of ratchet teeth 29 are provided on a disc 30, which is fixed on a shaft 34, this shaft 34, in turn, carrying one of the rollers 7 which drive the cylinder 5. A spring loaded pawl 37 (FIGURE 7) is yieldably slidable along the ratchet teeth 29 to prevent the disc 30 from reversing its direction.

The operation of the embodiment of the invention in FIGURES 5 to 7 is generally similar to the operation of the previously described embodiments.

In FIGURES 5 to 7, the pushing device 19 is driven through the same driving means operative to rotate the cylinder 5. In this regard, rotation of the drive shaft 31 rotates discs 21, which, in turn, operate the pushing device 19, as is apparent. The shaft 31 intermittently drives the cylinder 5 through bevel gears 23, 24, 25 and 26, and the cam and ratchet rings 28 and 29, respectively. As best shown in FIGURE 7, clockwise rotation of cam 28 provides for engagement of the ratchet ring 29 during each revolution of the shaft 33, thereby providing intermittent rotation of the cylinder 5 by roller 7, which is fixed to the shaft 34 along with the disc 30 carrying ratchet teeth 29. Thus, as the cylinder 5 is driven intermittently, the pushing device is continually rotated by the disc 25 to afford a pushing and cleaning action on the material adjacent the bars 6, thereby urging this material past the rim 18, as shown in FIGURE 5. Such an arrangement thereby affords an even wear on the bars 6 by virtue of the fact that the bars are continually moved from their lowest position in the cylinder 5 adjacent the pushing device 19, and by feeding the material in opposite directions, as is understood.

Preferably, the speed of rotation of the cylinder 5 in the embodiments of this invention is such that the difference between the feed velocity of the material and the peripheral speed of the screening deck is at least equal to the required minimum speed of travel of the material along the screening deck. This requirement relates mainly to that part of the cylindrical screening deck 5 where the direction of flow of the material is equal to the direction of rotation of the screening deck 5. Consequently, the screening deck will preferably be made to rotate very slowly, in this regard.

Also, the speed may be sufficiently high, if a point of the drum traverses the arc extending from the place where a layer of material is fed onto the screening deck to the place where this point enters the radius of action of the layer coming from the opposite direction, in the period of time elapsing, when a stationary bar screen is used, between two reversals of the screen, or of the direction of flow of the material.

As will be apparent, the various features of the modifications of this invention may be used interchangeably without departing from the scope thereof.

It will, therefore, be seen that there has been provided by this invention a structure in which the various objects hereinbefore set forth, together with many practical advantages, are successfully achieved.

As various possible embodiments may be made of the mechanical features of this invention, all without departing from the scope thereof, it is to be understood that all matters herein set forth or shown in the accompanying drawings is to be interpreted in an illustrative, and not in a limiting sense.

I claim:

1. Apparatus for wet-screening a mixture of fine abrasive particles and the like comprising: a rotatably mounted generally cylindrical screening desk having its axis substantially horizontal and defining a plurality of longitudinally disposed slots; means for feeding the mixture to be treated as a layer of substantially uniform thickness tangentially onto the concave side of said screening deck in opposite directions substantially perpendicular to the longitudinal axis thereof; means for rotating said cylindrical screening deck; means for collecting the oversize fractions of the mixture; means for collecting the undersize fractions of the mixture; said feeding means being above the lowest portion of said cylindrical screening deck and said feeding means including downwardly facing mouthpieces; and cleaning means for cleaning the bottom portion of the cylindrical screening deck including a brush, the hairs of which are operatively movable in the slots; and means to move said brush in a plane parallel to the slots.

2. Apparatus for wet-screening a mixture of fine abrasive particles and the like comprising: a rotatably mounted generally cylindrical screening desk having its axis substantially horizontal and defining a plurality of longitudinally disposed slots; means for feeding the mixture to be treated as a layer of substantially uniform thickness tangentially onto the concave side of said screening deck in opposite directions substantially perpendicular to the longitudinal axis thereof; means for rotating said cylindrical screening deck; means for collecting the oversize fractions of the mixture; means for collecting the undersize fractions of the mixture; said feeding means being disposed in the upper portion of said cylindrical screening deck above the lowest portion thereof and said feeding means including downwardly facing mouthpieces; brush cleaning means mounted for rotational movement between longitudinally spaced apart discs; driving means for imparting rotational movement to said discs to thereby rotate said brush cleaning means for cleaning the longitudinally disposed slots in the bottom portion of said cylindrical screening deck; said driving means cooperatively driving said means for rotating said cylindrical screening deck.

References Cited in the file of this patent
UNITED STATES PATENTS

| 16,495 | Pollock | Jan. 27, 1857 |
| 194,960 | Elliot et al. | Sept. 11, 1877 |
| 370,933 | Coughlin | Oct. 4, 1887 |
| 715,072 | Hollender | Dec. 2, 1902 |
| 855,981 | Rich | June 4, 1907 |
| 894,879 | Fuller | Aug. 4, 1908 |
| 1,301,683 | Goddu | Apr. 22, 1919 |
| 2,450,980 | Moyer | Oct. 12, 1948 |
| 2,748,951 | Dubach | June 5, 1956 |
| 2,799,394 | Boogaard | July 16, 1957 |
| 2,804,975 | Liebhart | Sept. 3, 1957 |
| 2,917,174 | Fontein | Dec. 15, 1959 |

FOREIGN PATENTS

| 7,771 | Great Britain | Sept. 20, 1906 |
| 964,321 | Germany | May 23, 1957 |
| 606,913 | Canada | Oct. 18, 1960 |

OTHER REFERENCES

Germany, K 781 V/1a, Jan. 19, 1956.